C. J. BROCKBANK.
APPARATUS FOR THE MANUFACTURE OF CHEMICAL COMPOUNDS.
APPLICATION FILED JAN. 7, 1914.
1,157,293. Patented Oct. 19, 1915.
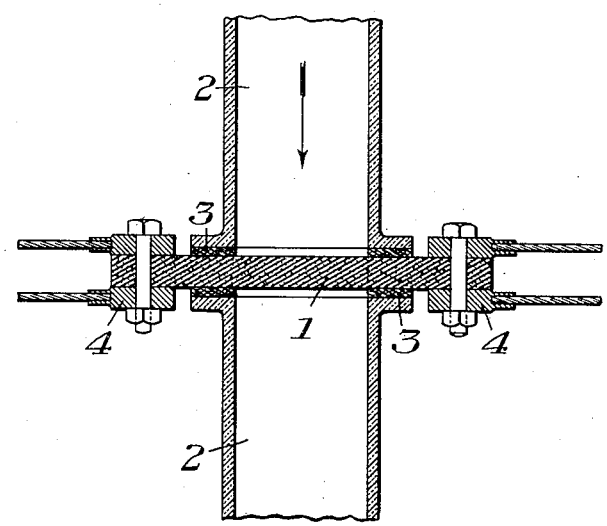
WITNESSES
INVENTOR

UNITED STATES PATENT OFFICE.

CLARENCE J. BROCKBANK, OF NIAGARA FALLS, ONTARIO, CANADA, ASSIGNOR TO THE CARBORUNDUM COMPANY, OF NIAGARA FALLS, NEW YORK, A CORPORATION OF PENNSYLVANIA.

APPARATUS FOR THE MANUFACTURE OF CHEMICAL COMPOUNDS.

1,157,293.   Specification of Letters Patent.   Patented Oct. 19, 1915.

Application filed January 7, 1914. Serial No. 810,758.

*To all whom it may concern:*

Be it known that I, CLARENCE J. BROCKBANK, a subject of the King of Great Britain, residing at Niagara Falls, Ontario, Canada, have invented a new and useful Improvement in Apparatus for the Manufacture of Chemical Compounds, of which the following is a full, clear, and exact description, reference being had to the accompanying drawing, forming a part of this specification, and in which the figure is a vertical section showing a typical embodiment of my invention.

My invention relates to the manufacture of chemical compounds, such as sulfuric acid by a catalytic process and is designed to improve the same by providing a more efficient method and means for bringing the gas in contact with the catalyzer.

It is also designed to do away with the need of preheating the gases and also for drying them; and to lengthen the life of the apparatus and increase its reliability and efficiency.

In the well-known process of making sulfuric acid by the contact method a catalyzer such as platinum is used. The sulfur or sulfid ores are roasted with an excess of air and the gaseous mixture, after drying, passes through a heating chamber where it is raised to from 380 to 400° C. The hot gases are then led to the converter which usually consists of an iron chamber about six feet in diameter by eight feet high, containing the catalyst mixture, which usually consists of granular $MgSO_4$ carrying 0.2% of platinum. This mixture is spread on trays and by suitable baffles the gases are caused to traverse each layer, where the combination of the sulfur dioxid and oxygen is effected by the platinum.

After the mixture of sulfur dioxid and air is formed therefore there are three distinct steps in the usual operation, as follows: (a) The drying of the gaseous mixture. (b) The heating of the same to a temperature of nearly 400° C, and (c) The treatment of the heated gases with the catalyst.

In carrying out my invention I use a porous diaphragm instead of the usual mixture carried in trays, this porous diaphragm having the catalyzer deposited on and preferably in the interstices thereof. The gaseous mixture is forced through this diaphragm, which is preferably formed of porous carborundum with platinum deposited in its interstices; and I preferably heat this diaphragm by passing electric current through it and using it as a heating element.

In the preferred form of my invention, I use a diaphragm formed of compacted carborundum of a substantially uniformly porous structure composed of very fine carborundum crystals, such, for example, as granted in United States Patent No. 992,698 to Frank J. Tone on May 16, 1911. Such carborundum diaphragm preferably has no foreign binding material and is one of the few materials which is not acted upon by the products produced in this method of manufacturing sulfuric acid. I impregnate this plate with platinum preferably by soaking in a solution of platinum chlorid and heating it to redness. This decomposes the chlorid and deposits metallic platinum in the interstices of the plate or diaphragm. A carborundum plate made up in this form is a conductor of electricity having certain resistance and when subjected to the passage of electric current becomes heated and may be used as a gas heating element.

In the accompanying drawing showing a typical form of my invention, 1 is the porous carborundum diaphragm containing the catalytic agent; 2 is a pipe composed of stoneware or similar acid proof material, and formed in sections between the ends of which the diaphragm 1 is seated.

3 is a packing as asbestos cement, or other suitable material, and forming a gas-tight joint.

4 designate the electric terminals which are bolted to the plate 1.

In using this apparatus, I provide a converter or holder in which the mixture of sulfur dioxid and air is sucked or forced through the carborundum plate, which is heated by an electric current to a temperature sufficient to cause a reaction between the sulfur dioxid and oxygen to form $SO_3$. The heating is under complete control and can be adjusted and regulated for varying gas mixtures and conditions. As the gases pass through the fine porous material they are almost instantaneously converted—much more completely than in the old process where they travel over the surface of the catalyzing mixture. The desirable temperatures in my process range from 400 to 800° C.

The advantages of my invention will be appreciated by those skilled in the art. The preheating of the gases is rendered unnecessary and the heating thereof by the catalyst diaphragm is under complete instantaneous control. The preliminary drying of the gases which is some times done to avoid corroding of the converting apparatus is unnecessary in my apparatus.

The carborundum plate is not attacked by fuming sulfuric acid and the catalyzer will therefore have an exceptionally long life. In case of poisoning of the catalyzer by arsenic or other impurities, it may be quickly restored by immersing the diaphragm in aquaregia and reheating it. Other catalyzers than platinum may be employed and many changes may be made in the form and arrangement of the converting apparatus without departing from my invention.

I claim:

In apparatus for the manufacture of chemical compounds by a catalytic process, a converter containing a porous diaphragm carrying a catalyzer in its interstices, said converter being composed of compacted carborundum without foreign binding material, and means for electrically heating said carborundum by passing current therethrough.

In testimony whereof, I have hereunto set my hand.

CLARENCE J. BROCKBANK.

Witnesses:
H. C. Martin,
W. J. Fawcett.